Sept. 29, 1942.　　　　　A. TRASK　　　　　2,296,883
METHOD OF MAKING INLET VALVES FOR REFRIGERATING COMPRESSORS
Filed May 6, 1937　　　　2 Sheets-Sheet 1

Inventor.
Allen Trask.
By: Carl S. Lloyd
Atty.

Sept. 29, 1942.　　　　A. TRASK　　　　2,296,883
METHOD OF MAKING INLET VALVES FOR REFRIGERATING COMPRESSORS
Filed May 6, 1937　　　2 Sheets-Sheet 2
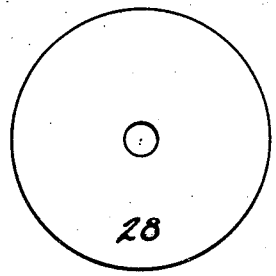
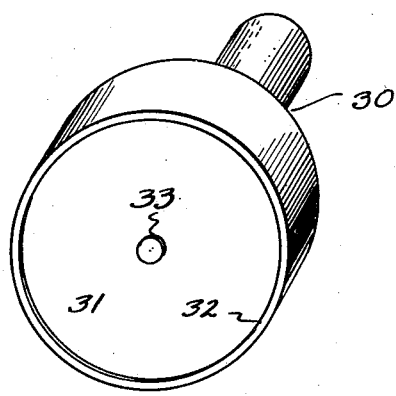
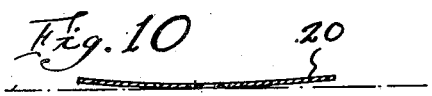
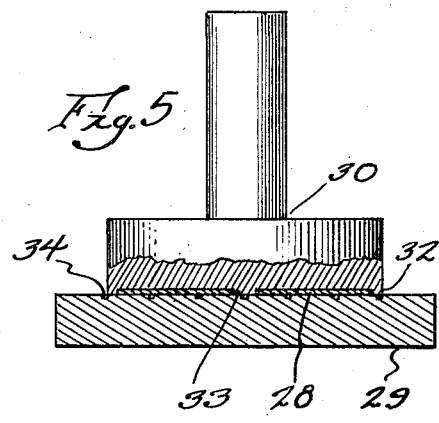
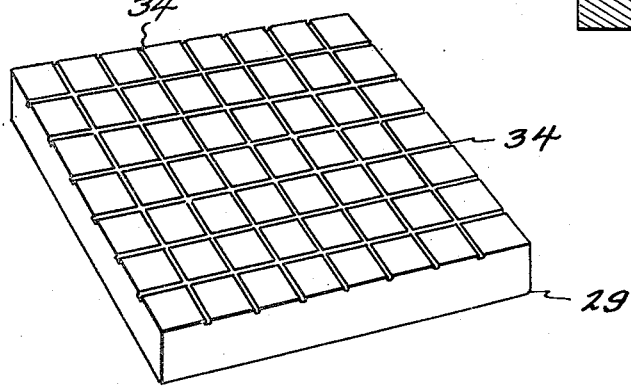
INVENTOR
Allen Trask
BY
ATTORNEY Patented Sept. 29, 1942

2,296,883

UNITED STATES PATENT OFFICE 2,296,883

METHOD OF MAKING INLET VALVES FOR REFRIGERATING COMPRESSORS

Allen Trask, Chicago, Ill., assignor to Mills Novelty Company, Chicago, Ill., a corporation of Illinois Application May 6, 1937, Serial No. 141,120

9 Claims. (Cl. 29—157.1)

This invention relates to inlet valves for compressors, of the type disclosed in my pending application Serial No. 739,193, filed August 10, 1934, and now matured into Patent No. 2,106,775, of which the present application forms a continuation in part.

An object of the invention is to provide a compressor of the type specified, in which maximum volumetric efficiency (maximum intake of the fluid to be compressed) is secured. This is accomplished by using on the head of the reciprocating piston, a normally dished inlet valve of such curvature, weight, and flexibility, and so correlating it and the speed of reciprocation of the piston, that the valve will flatten out against its seat largely under the influence of inertia.

In order to secure this result, the valve must be extremely sensitive. I find that its curvature must be slight, and that it must be precision shaped to within two-thousandths of an inch error.

A necessary object of the invention has been to find a method by which a valve having such characteristics could be produced in quantities on an economical production basis, within the required range of precision.

In general, the invention is carried out by selecting a sheet of material having the desired characteristics of flexibility, elasticity, and hardness, and substantially the thickness of the finished valve, then die punching a perfectly flat disc from the sheet, and then subjecting one face of the disc to an abrading operation which unequalizes the surface tensions or strains in the respective face regions of the disc, whereby the disc will, in response to such unequal strains, become bowed into a dished shape until the strains are equalized.

Further objects of the invention will be apparent from a perusal of the following specifications in connection with the accompanying drawings, in which:

Fig. 5 is a view similar to Fig. 2, of another form of the lapping apparatus;

Fig. 6 is a perspective view of the lapping tool;

Fig. 7 is a perspective view of the lapping block;

Fig. 8 is a perspective view of the valve disc produced by the lapping apparatus of Fig. 5;

Fig. 9 is a diametrical sectional view of the valve disc before it is lapped; and Fig. 10 is a similar view of the valve disc after it is completed.

Figure 1:
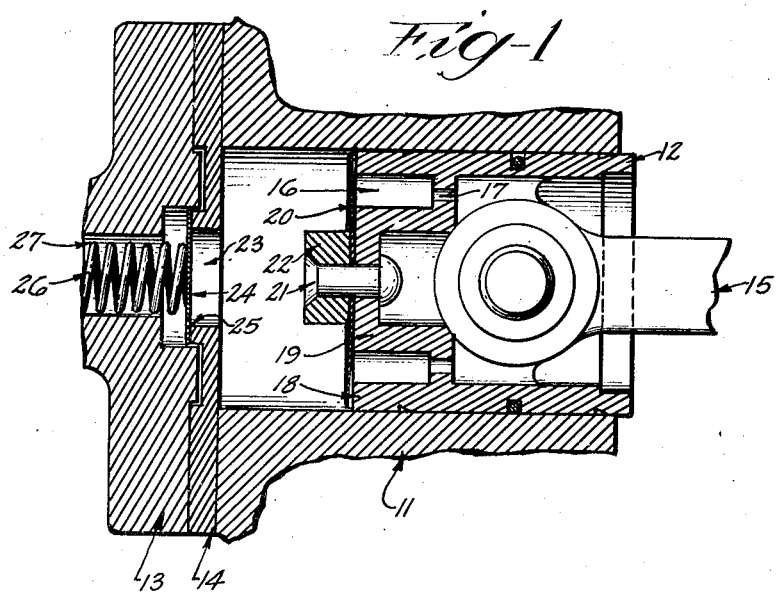
Fig. 1 is an axial sectional view through the compression chamber and piston of a compressor embodying my invention.
Figure 2:
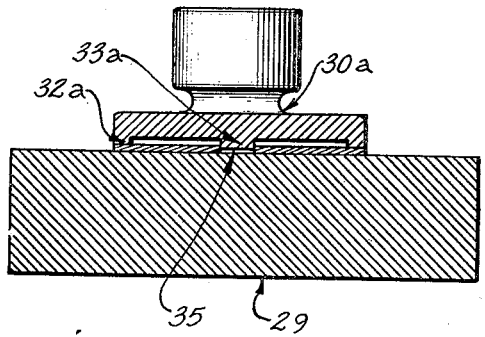
Fig. 2 is a sectional view of one form of lapping apparatus for producing curvature in the valve disc, the latter being shown prior to commencing the lapping operation.

Referring first to Fig. 1, the invention is embodied in a compressor having a cylinder 11, a reciprocating piston 12 therein, a head 13, and a discharge valve seat partition 14 which, in conjunction with the cylinder 11 and the piston 12, forms the compression chamber.

The piston 12 is reciprocated by the connecting rod 15. In the head of the piston is an annular channel 16, connected to the space in the rear of the piston by openings 17 through the bottom of the channel. The rim of the piston defining the outer wall of the channel 16, is machined perfectly flat and in the plane of the central region 19 of the piston head, to form an intake valve seat 18.

The intake valve 20 is secured to the central region 19 by means of a rivet 21 and a rivet button 22, the latter being adapted to fill the discharge port 23 in the discharge valve partition 14.

The discharge valve 24 is a flat disc of metal, held against the valve seat 25 formed in the partition 14 around the rear side of the port 23, by means of a coil spring 26, retained under compression in the discharge outlet 27 in the head 13, between the head and the valve 24.

The intake valve 20 is normally dished from its center, where it is rigidly secured to the head of the piston toward its periphery and axially away from the piston head. At its periphery it is thus spaced from the seat 18 to provide for intake of the refrigerant gas during the intake stroke.

In this connection, the channel 16, extending around the entire periphery of the piston, allows the gas to flow between the seat 18 and the periphery of the valve 20 with uniform intensity all around said periphery.

Figure 3:
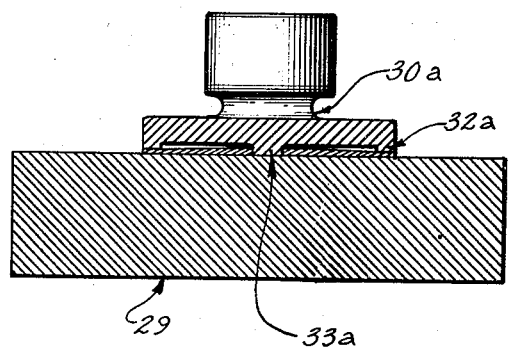
Fig. 3 is a similar view showing the valve at the completion of the lapping operation.
Figure 4:
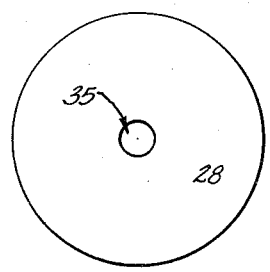
Fig. 4 is a plan view of the valve disc produced by the lapping apparatus of Fig. 2.

Following is a set of specifications of one example of each of the valves disclosed in Figs. 10 and 3 respectively.

The valve of Fig. 10 is about .009 inch in thickness, and an inch in diameter. It is made of spring metal, having characteristics equivalent to those of Swedish flapper valve steel. Its curvature is such that its periphery is normally spaced from about .004 to .005 inch from the seat.

All other conditions being the same, the valve of Fig. 3 has a thickness, at the center, of about .010 inch and, at its periphery, of about .008 inch.

In making the valve, sheet material of about .010 inch thickness, and having the desired characteristics of hardness to resist wear, flexibility to permit flexing, and elasticity to resist any tendency toward permanent distortion and fatigue, is selected. Swedish flapper valve steel is the material I prefer to use. Circular discs, perfectly flat, are die-punched from the sheet stock.

The discs thus formed are then subjected to an abrading or lapping operation which removes a thin stratum of metal, about .001 inch thick, from the under side of the disc. The top side may, if desired, be polished for the purpose of giving it a smooth, bright finish; but if this is done, the amount of metal thus removed is small and insufficient to change the surface tension characteristics of that side. In the preferred practice, however, the top side of the disc is allowed to retain its original finish produced in the rolling of the sheet stock.

The lapping may be done either by hand or by automatic machinery, but in either case, is carried on by pressing the blank against either a flat lapping block 29 (Fig. 7) or a concave block of cast iron or similarly suitable material.

In the lapping process, the upper surface of the block 29 is covered with a thin layer of mixed liquid and powdered abrasive. The valve disc 28 is held flat on this plate by the holder 30, and slid on the abrasive mixture with sufficient pressure to cause the abrasive to cut from the disc a thin layer of metal, about .001 inch thick.

The lapping tool 30 has a flat face 31 (Fig. 6) which engages the upper face of the blank 28 and provides the pressure for holding the blank flatly against the flat upper face of the block. If a concave block is used, the tool will be correspondingly convex. The disc is retained against slipping laterally from under the lapping tool, by either a rim 32 adapted to embrace the blank, or a center lug 33 adapted to project into the center hole 35 of the disc. In either case, the rim 32, or the lug 33, projects axially beyond the face 31, a distance less than the thickness of the finished valve disc. Either the rim 32 or the lug 33 or both, may be employed.

The material used, being sheet material, is a product of a rolling process, in which the surfaces of the sheet are given a consistency differing from that of the interior. It is believed that the surface regions of the material are under a tension as compared to the interior, or to put it reversely, the interior is under compression with respect to the surface regions, the latter being tougher because of the more direct action of the rolls thereon.

I have discovered that removing one of these surface regions while allowing the opposite surface to remain completely or substantially intact, decreases the surface tension in one face sufficiently below that of the other, so that the disc will become bowed into a dished shape.

I have also discovered that the amount of curvature thus imparted, may be controlled between the limits of all possible desirable curvatures, by varying the size of the grains of the abrasive. The valve of Fig. 10, as specified above, lapped with a compound, the grains of which are 10 to 30 microns in diameter, will assume a curvature of approximately .003 inch from the original flat plane of the blank. Lapped with a compound, the grains of which are 25 to 60 microns in diameter, the same valve will assume a curvature of .006 inch; and where a compound of 45 to 80 microns is used, the curvature will be as high as .008 inch.

Apparently the difference between the action of fine and coarse abrasives, each cutting away the same amount of metal, is the result of a peening or swedging action produced by the irregular corners of the abrasive particles as they are rolled over between the disc and the lapping block. It is believed that this action tends to hammer out the metal of the face region which is being lapped, placing such region under compression with relation to the unlapped side.

That this is true, is, I believe, established by the fact that after a given curvature has been produced by using one of the coarser grades of abrasive, for example, the curvature may be reduced by further lapping with a finer grade of compound. The apparent explanation of this phenomenon is that the subsequent lapping with finer compound removes additional metal without producing the peening effect of the coarser compound, thus reducing the compression in the convex side.

It is my theory that there is a definite point in the lapping process where the surface tension removal is completed and that further lapping beyond this point results in placing the surface under compression with respect to the interior of the disc.

It is possible thus to reduce the valve curvature from .009 inch to .003 inch lift (spacing of valve periphery from seat), in a disc valve of approximately one-inch diameter.

Various types and makes of lapping machines are to be had on the market. As far as the lapping process is concerned, whether it be by hand or my machine, the essential parts are a holder for the part to be lapped, and a lapping block upon which the part is moved by the holder.

The grooves 34 in the lapping block are for the purpose of holding excess lapping compound.

The lapping compound may be granulated abrasive such as silicon carbide or aluminum oxide mixed in a liquid to the desired consistency.

The valve of Fig. 10 is the preferred form of the invention.

In the valve of Fig. 3, the lapping tool 30a is modified by forming the peripheral flange 32a of smaller diameter so as to contact the peripheral region of the valve disc and apply the pressure thereto, and forming the lug 33a of greater projection than the flange, whereby it may enter the hole 35 while the flange 32a rests on top of the valve.

As a result of applying the pressure just to the peripheral region of the valve disc, the pressure between the face of the disc and the lapping block, is graduated from maximum at the periphery to minimum at the center, as a result of the elasticity of the disc. The resulting cut thereby produced leaves the blank tapered in radial cross-section, from a maximum thickness at the center to a minimum thickness at the periphery, as above set forth, since the rate of cutting is in direct proportion to the pressure applied.

The valve thus produced is spherically dished, just as is the valve of Fig. 10, and the radius of curvature of its convex side will be less than the radius of curvature of its concave side.

Either of the valves specified above, use in connection with a piston reciprocating at a speed of 1,750 reciprocations per minute, will give the hermetic compressor disclosed in my copending application Serial No. 739,193, an efficiency greater than that of any prior known small hermetic reciprocating compressor. They permit the use of split phase motors up to ¼ horse power, on compressors used in domestic refrigeration, and permit the use of higher powered compressors, such as would be required in larger refrigeration units such as air conditioners, to have a low starting torque and current demand that does not exceed the capacity of a household electric circuit. The split phase motor is considerably cheaper than induction motors of other types.

In addition to the foregoing, the dished valve of my invention is more silent in operation than prior valves, for the reason that in flexing to a flattened position against the valve seat, it achieves what is similar to a rolling motion, the area of contact between the valve and its seat gradually spreading radially outwardly.

The valve maintains its curved shape while the piston on which it is mounted moves rearwardly on the intake stroke, and the refrigerant gas is allowed to flow through the channel 16 and between the valve seat and the periphery of the valve into the cylinder. The valve remains curved and open while the piston passes lower dead center and starts forwardly on the compression stroke. As the acceleration of the piston increases, the valve will flatten out under its own inertia, and will close at a point between lower dead center and 45° therebeyond. The closing point will in most cases be somewhat near 25° past lower dead center, but will vary somewhat in accordance with the density of the refrigerant.

The retardation of closing, past lower dead center, allows the refrigerant, lagging under its own inertia, to pour into the cylinder until the pressure therein is not only brought up to a point equal to, but higher than, external pressure, as a result of the momentum of the gas. The closing of the valve is timed near to the point where the intake of gas would cease under the balancing of such momentum against the back-pressure in the cylinder.

The final closing of the valve may or may not be assisted by impact against the refrigerant gas, depending upon how closely the closing is timed to the point of cessation of gas flow. However, after the valve has passed 45° beyond lower dead center (point of maximum acceleration), the back pressure of the gas will begin to assist inertia in holding the valve closed, and when the valve has passed 90° beyond lower dead center (where the piston commences to decelerate), the pressure of the partially compressed gas will completely usurp the function of holding the valve closed. The valve will open again as the piston commences its return stroke.

It will be seen from the foregoing that the invention provides a very efficient compressor intake valve. Since the valve is produced from an originally flat disc, it will, in flattening out, naturally resume a flat shape. This is true because the change in stresses and strains in the disc, imparted by the lapping operation, is a symmetrically uniform one, without distortion. In attempting to produce the curvature by a stamping process, there is a tendency to produce unequalities in stress in the curved disc. This would necessarily result if there were any unequalities in the temper of the flat stock, since the stamping die would force the stock to assume a uniform curvature in all pieces produced, without regard to the resistance to bending offered by various regions of the flat stock. Thus, although the curved disc thus produced might have substantially perfect symmetry of form, its internal stresses might be distinctly non-symmetrical, i. e., non-uniform around the circumference of the disc, and thus result in distortion when the disc flattens out, and failure to achieve a perfectly flat shape. On the other hand, my valve, if the flat stock from which it is produced is not of absolutely uniform quality throughout, may not achieve perfect symmetry in its curved condition, but will return to accurate flatness as it flattens out.

It is to be understood the foregoing specifications are suitable for a valve usable in compressing a refrigerant of low density, such as methyl chloride or sulphur dioxide, and that some adjustment will have to be made in the valve curvature, or thickness, in order to adapt it for use with a refrigerant of different density, other conditions remaining the same. For example, the curvature of the valve should be increased for use with Freon, which is relatively heavy (approximately five times as heavy as air), and possibly the valve should also be slightly thicker or be made stiffer in some manner. This is particularly true where Freon is to be pumped under atmospheric or greater than atmospheric pressures, although when pumping Freon under a partial vacuum, the valve specified above is fairly satisfactory.

The importance of the present invention will be appreciated when it is realized that hitherto in the refrigeration art, it has been considered necessary to devise expensive and complicated mechanisms for achieving the unloading of a compressor. For example, in many refrigerators now on the market, a complicated system of by-pass, valve for keeping by-pass open until proper speed has been reached, and control mechanism for closing the valve when such speed has been attained, is still being used.

The present valve not only completely eliminates the necessity for such complicated unloading mechanism, but actually produces a superior type of unloading function in that it unloads the compressor both while maximum speed is being approached and when the compressor is slowing down to a stop. The inherent tendency of the valve to open, manifests itself as the compressor slows down and the inertia factor correspondingly decreases.

The foregoing specific examples are to be taken as illustrative merely, of valves that satisfy the requirements of the invention, and are not to be construed as limiting the scope of the appended claims, which are intended to cover all forms in which the invention may be embodied, including the use of mechanical equivalents, falling within the true scope of the invention.

While it is possible to employ the foregoing described features in a compressor in which the valve seats by the combined effect of inertia and fluid resistance, in the preferred form of the invention, the thickness, diameter, and elasticity of the valve disc, the region of attachment of the disc to the piston head, the normal clearance between the valve disc and the valve seat, and the speed of reciprocation of the piston 12 are so related to one another that the inertia of the valve will overcome its elastic tendency to being unseated at that point of the compression stroke of said piston at which no fluid tends to flow through said valve. In other words, the arrangement is such that the valve will close solely by inertia without the assistance of the fluid which is being compressed. It is common practice in compressors to arrange the parts so that as the piston commences to compress the gas which has been drawn into the cylinder on the intake stroke, the pressure thus developed will aid in the closing of the intake valve. However, where this is the case, the pressure thus developed will cause a portion of the gas to escape before the intake valve closes.

The present invention aims to achieve maximum compressing efficiency by retaining all of the gas which has been drawn into the cylinder, the valve being arranged to close exactly at the point where all movement of the gas has stopped.

Owing to the momentum of the fluid as it flows into the compression chamber on the intake stroke, it will continue to flow into the compression chamber after the pressure difference between the chamber and the source of intake fluid has become equalized. Thus it is possible to attain momentarily in the compression chamber a fluid pressure greater than that at its source. The present invention takes advantage of this momentum induced fluid pressure by closing the valve structure exactly at the point where the fluid flow is at a standstill.

I claim as my invention:

1. The method of making a thin and flexible disc valve, comprising the following steps: selecting a sheet of Swedish flapper valve steel; punching a flat blank from said sheet; and then removing a thin stratum of the metal from one side face only of the blank, whereby said blank is caused to assume a normally curved shape.

2. The method of making a thin and flexible disc valve having a normally spherically dished shape, comprising the following steps: fabricating from sheet material produced by a polling process a flat blank of approximately the required dimensions, and then abrasively removing a thin stratum of the metal from one side face only of said blank.

3. The method of making a thin and flexible disc valve having a normally dished shape, comprising the following steps: fabricating a flat blank of rolled spring metal of approximately the required dimensions, and removing metal from one side face only of said blank so as to cause it to bow into dished shape of substantially uniform curvature throughout.

4. The method of making disc valves which comprises forming from sheet metal produced by a rolling process a thin flat circular blank, and abrasively removing the surface metal from one side only of the blank, whereby the disc is caused to normally assume a substantially spherically dished shape.

5. The method of making disc valves which comprises forming a circular blank of thin sheet metal the surface layers of which are under tension as compared to the interior, and the tension of said surface layers on each side being substantially equal and balanced, so that the blank lies flat when free, and abrasively removing the surface layer from one side only of the blank to such an extent that the tension on that side of the blank is decreased sufficiently to destroy the original balance to cause the disc to assume a substantially spherically dished shape.

6. The method of making disc valves which comprises forming a circular blank of thin sheet metal the surface layers of which are under tension as compared to the interior, and the tension of said surface layers on each side being substantially equal and balanced, so that the blank lies flat when free, and abrasively removing the surface layer from one side only of the blank to a depth of the order of one tenth the thickness thereof to cause the tension at that side of the blank to decrease to such an extent that, under the influence of the tension existing on the other side of the blank, the disc assumes a bowl shape of substantially uniform curvature throughout its area.

7. The method of making disc valves which comprises forming a circular blank of thin sheet metal the surface layers of which are under tension as compared to the interior, and the tension of said surface layers on each side being substantially equal and balanced, so that the blank lies flat when free, and abrasively removing the surface layer from one side only of the blank to a depth which is uniform at all points around the center of the disc at any given radius, and which is sufficient to decrease the tension on that side and unbalance the stresses to such extent as to permit the tension existing on the other side to predominate and to cause the disc to normally assume a substantially spherically dished shape.

8. The method of making disc valves which comprises forming a circular blank of thin sheet metal having a diameter of the order of one hundred times its thickness, the surface layers of which are under tension as compared to the interior, and the tension of said surface layers on each being substantially equal and balanced, so that the blank lies flat when free, and abrasively removing the surface layer from one side only of the blank to a depth of the order of one tenth the thickness thereof to cause the tension at that side of the blank to decrease to such an extent that, under the influence of the tension existing on the other side of the blank, the disc assumes a bowl shape of substantially uniform curvature throughout its area.

9. The method of making disc valves which comprises forming a circular blank of thin sheet metal the surface layers of which are under tension as compared to the interior, and the tension of said surface layers on each side being substantially equal and balanced, so that the blank lies flat when free, removing by means of a granular abrasive the surface layer of metal from one side only of the blank to such an extent that the tension on that side of the blank is decreased sufficiently to destroy the original balance to cause the disc to assume a bowl shape of substantially uniform curvature, and choosing the grain size of the abrasive in accordance with the ultimate degree of curvature desired.

ALLEN TRASK.